United States Patent [19]
Weems et al.

[11] Patent Number: 5,815,543
[45] Date of Patent: Sep. 29, 1998

[54] SEISMIC SUPPORT WITH CLEARANCE GAP AND YIELDABLE MEMBER

[75] Inventors: Sterling J. Weems, Chevy Chase, Md.; Thomas E. Greene, Alexandria, Va.

[73] Assignee: MPR Associates, Inc., Alexandria, Va.

[21] Appl. No.: 621,498

[22] Filed: Mar. 25, 1996

[51] Int. Cl.[6] .................................................. G21C 9/00
[52] U.S. Cl. ........................ 376/285; 376/302; 52/167.7
[58] Field of Search .................... 376/285, 302; 52/167.1, 167.7, 167.8, 167.9

[56] References Cited

U.S. PATENT DOCUMENTS

| | | | |
|---|---|---|---|
| 3,129,836 | 4/1964 | Frevel | 376/285 |
| 3,850,795 | 11/1974 | Thome | 376/302 |
| 4,011,132 | 3/1977 | Kumpf et al. | 376/285 |
| 4,073,685 | 2/1978 | Brown et al. | 376/302 |
| 4,135,974 | 1/1979 | Garkisch et al. | 376/302 |
| 4,379,119 | 4/1983 | Fujimoto | 376/302 |
| 4,596,689 | 6/1986 | Gorholt et al. | 376/302 |
| 5,402,570 | 4/1995 | Weems et al. | 376/302 |
| 5,430,779 | 7/1995 | Baversten et al. | 376/302 |
| 5,502,754 | 3/1996 | Erbes | 376/302 |
| 5,577,082 | 11/1996 | Weems et al. | 376/302 |
| 5,588,031 | 12/1996 | Bevilacqua et al. | 376/302 |
| 5,600,688 | 2/1997 | Jung | 376/260 |
| 5,600,689 | 2/1997 | Weems et al. | 376/302 |

FOREIGN PATENT DOCUMENTS 5077246   1/1977   Japan .

*Primary Examiner*—Daniel D. Wasil

[57] ABSTRACT

In a nuclear reactor including a reactor vessel and a core shroud disposed within the reactor vessel in laterally spaced relation, a seismic support includes a spacer extending between laterally opposed surfaces of the reactor vessel and the core shroud to limit lateral movement of the core shroud relative to the reactor vessel and a deformable member carried by the spacer and having a configuration to deform substantially elastically in response to impacts caused by an operating basis earthquake and substantially plastically at relatively constant load in response to impacts caused by a design basis earthquake. The deformable member can be carried at an end of the spacer adjacent the reactor vessel or between the spacer and a bearing plate, and can be formed of a material having a yield strength less than that of the spacer and/or be of reduced cross-sectional area as compared with the spacer to yield under a desired seismic load. In a preferred embodiment, the seismic support defines a bearing surface in spaced relation with an interior surface of the reactor vessel to define a clearance gap that minimizes the frequency and magnitude of impacts between the core shroud and the reactor vessel.

14 Claims, 3 Drawing Sheets

SEISMIC SUPPORT WITH CLEARANCE GAP AND YIELDABLE MEMBER

BACKGROUND OF THE INVENTION

1. Field of the Invention

The present invention relates to seismic supports and, in particular, to seismic supports that hold a boiling water reactor shroud in place relative to a reactor vessel during seismic events.

2. Discussion of the Prior Art

Boiling water reactor shrouds are disposed concentrically within reactor vessels to divide the flow of coolant water through the reactor vessels and to structurally support and align the fuel assemblies, steam separator assemblies and control rod guide tubes. The shrouds are generally cylindrical and are typically formed of multiple arcuate steel plates joined by welds along abutting vertical and horizontal edges. After periods of use, cracking of the shroud within heat affected zones of the welds tends to occur as a result of corrosion, radiation and stress. Cracking of the vertically oriented welds is considered acceptable because these welds are relatively short in length, relative to the overall shroud length, and do not adversely affect the function of the shroud. When excessive cracking of the horizontally oriented welds occurs, however, the shroud must either be replaced or repaired.

U.S. Pat. No. 5,402,570 to Weems et al, the disclosure of which is incorporated herein by reference, describes a method of repairing boiling water reactor core shrouds having horizontal cracks in heat affected zones of welds by securing plural tie-rods in vertical orientation about the periphery of the cracked shroud to axially compress the shroud and thereby urge the opposing surfaces of the horizontal cracks toward one another. Lateral or radial spacers are installed between the inner surface of the reactor vessel and the outer surface of the shroud and/or tie-rods to resist horizontal seismic loads and to hold the shroud in place relative to the vessel wall in the event of cracking along any horizontal weld during a seismic event.

Inserting elastic springs in compression between the inner surface of the vessel and the tie-rods to serve as lateral supports for absorbing the energy of impact caused by a seismic event has also been considered. Unfortunately, elastic spring-type supports of the size needed to absorb the energy of a seismic event tend to be expensive and can actually increase impact loading of the vessel and shroud since the force needed to deform a spring generally increases with the amount of deflection and since most of the energy absorbed by the spring (i.e., the average force applied to the spring multiplied by the amount of deflection) is returned to the system in the form of rebound energy. In addition, elastic spring-type supports may be susceptible to vibration resonance effects which can further increase impact loading of the vessel and shroud.

SUMMARY OF THE INVENTION

Accordingly, it is a primary object of the present invention to improve seismic supports of the type that hold a boiling water reactor shroud in place relative to a reactor vessel wall in the event of a seismic event.

It is another, more specific, object of the present invention to reduce the number of shroud impacts with the reactor vessel during seismic events by establishing a clearance gap between the reactor vessel and seismic supports mounted on the shroud.

Yet another object of the present invention is to limit impact loading of a boiling water reactor shroud during a seismic event by using some of the seismic energy to plastically deform seismic supports mounted on the shroud.

The present invention has another object in minimizing the effects of seismic loading on a boiling water reactor shroud repaired using tie-rods by establishing a gap between the reactor vessel and seismic supports mounted on the tie-rods and permitting the seismic supports to deform plastically during severe seismic events.

Some of the advantages of the present invention over the prior art are that the seismic supports can be mounted directly on a boiling water reactor shroud or on tie-rods secured about the periphery of a boiling water reactor shroud as part of a boiling water reactor shroud repair, that the seismic supports can reduce lateral loads on the nuclear fuel, fuel support structures and the connections between the fuel support structures and the shroud as well as on the shroud and the reactor vessel, that the seismic supports can serve as a major vibration dampener and reduce the tendency for resonance, that the seismic supports can be designed to continue functioning after operating basis earthquakes without requiring replacement or repair, and that the seismic supports can be inexpensively manufactured and installed without modification of existing reactor internal equipment and without affecting the function of the core shroud.

The present invention is generally characterized in a nuclear reactor including a reactor vessel, a core shroud disposed within the reactor vessel in laterally spaced relation and a seismic support including a spacer extending between laterally opposed surfaces of the reactor vessel and the core shroud and a deformable member carried by the spacer and having a configuration to deform substantially elastically in response to impacts caused by an operating basis earthquake and substantially plastically at relatively constant load in response to impacts caused by a design basis earthquake. The deformable member can be carried at an end of the spacer adjacent the reactor vessel or between a bearing member and the spacer. Preferably, a plurality of such seismic supports are disposed at angularly spaced locations between laterally opposed surfaces of the reactor vessel and the core shroud; and, in one embodiment, a plurality of tie-rods are secured to upper and lower portions of the core shroud at angularly spaced locations with each of the seismic supports being mounted on one of the tie-rods. When mounted on tie-rods, the seismic supports preferably extend radially outward from the tie-rods to define bearing surfaces in contact with the reactor vessel or laterally spaced from the reactor vessel to define a clearance gap therebetween.

Another aspect of the present invention is generally characterized in a method of maintaining a nuclear reactor core shroud in spaced relation with a nuclear reactor vessel during seismic events including the step of mounting a plurality of seismic supports between opposed surfaces of the core shroud and the reactor vessel, wherein each seismic support includes a spacer carrying a deformable member having a configuration to deform substantially elastically in response to impacts caused by an operating basis earthquake and substantially plastically at relatively constant load in response to impacts caused by a design basis earthquake. In a preferred embodiment, the seismic supports are mounted on a plurality of tie-rods, and the tie-rods are secured to sites on the core shroud adjacent the top and bottom of the shroud at a respective plurality of angularly spaced locations about the shroud periphery.

Other objects and advantages of the present invention will become apparent from the following description of the preferred embodiments taken with the accompanying drawings, wherein like parts in each of the several figures are identified by the same reference numerals or by reference numerals having the same last two digits.

DESCRIPTION OF THE PREFERRED EMBODIMENTS

Figure 1:
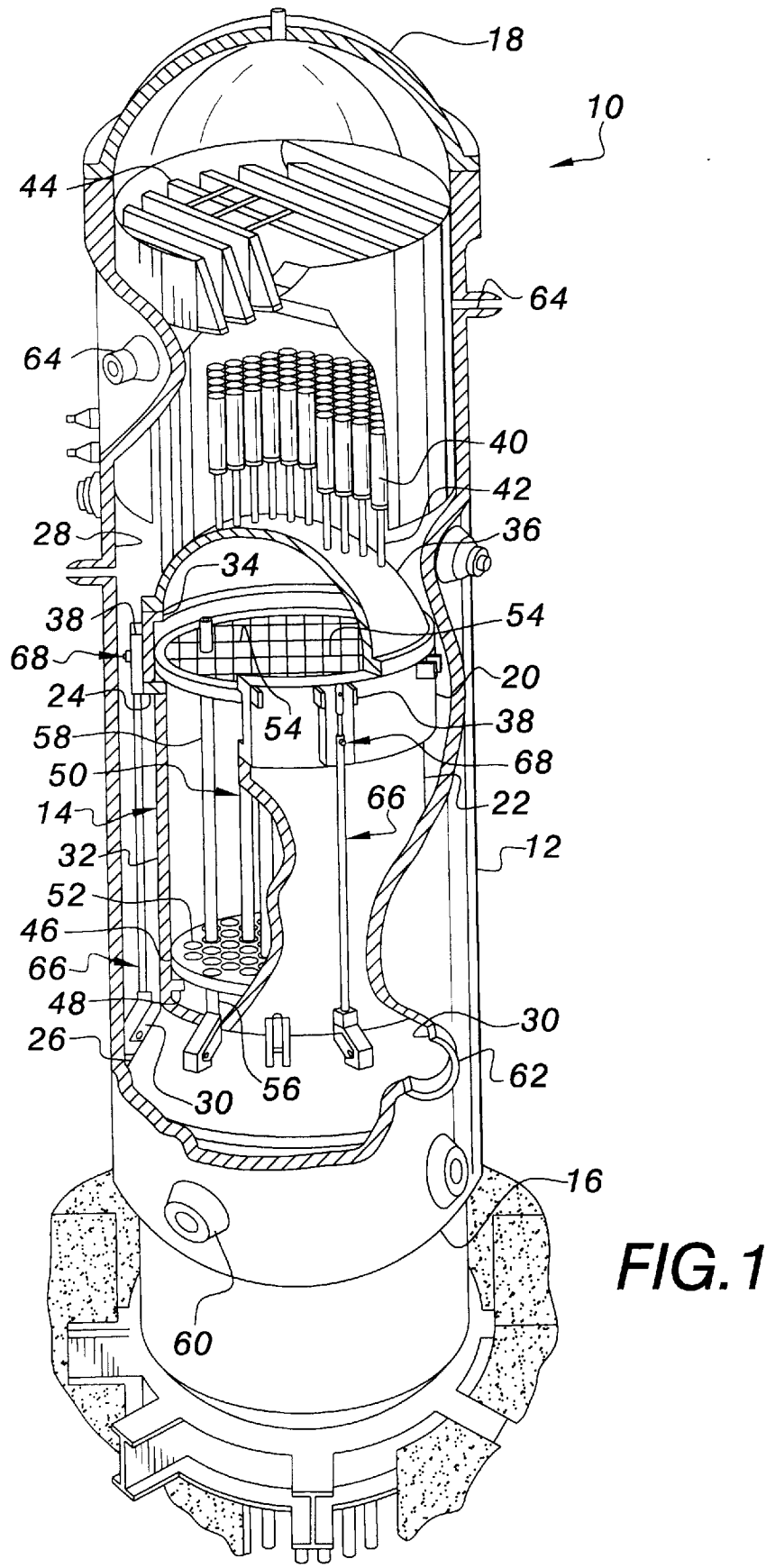
FIG. 1 is a cut-away view in perspective of a boiling water reactor repaired using tie-rods and seismic supports according the present invention.

A boiling water reactor 10 according to the present invention, as shown in FIG. 1, includes a reactor vessel 12 with a core shroud 14 disposed concentrically within the vessel in laterally spaced relation thereto. Vessel 12 is generally cylindrical with a closed-hemispherical bottom 16 and an open, circular top sealed by a hemispherical lid 18. Shroud 14 includes stepped upper and lower cylindrical sections 20 and 22 connected by a horizontal ring 24 extending radially inward from a bottom edge of the upper cylindrical section to an upper edge of the lower cylindrical section and a frustoconical support structure 26 diverging from a bottom edge of the lower cylindrical section to abut an interior surface 28 of reactor vessel 12. Support structure 26 can be fastened to vessel 12 by any known method but is preferably welded to the vessel at the annular abutment location. The upper edge of the support structure can be formed integrally with or welded to the bottom edge of the lower cylindrical section 22. A plurality of brackets 30 are secured by welding or any other known method between an exterior surface 32 of the lower cylindrical section of shroud 14 and a top surface of frustoconical support structure 26 to provide additional strength for the junction of the support structure and the shroud. Brackets 30 are spaced at regular or irregular angular intervals about the periphery of shroud 14 and, as shown, the lowermost part of each bracket 30, extending along support structure 26, is radially spaced from the interior surface of vessel 12.

A radial flange 34 extends radially inward from an upper edge of the shroud upper cylindrical section 20 to support a generally hemispherical shroud sealing lid 36, the lid being secured to the top of the shroud with bolts (not shown) threadedly or otherwise engaged by lugs 38 mounted in angularly spaced relation about the shroud periphery adjacent the upper edge of the shroud.

Shroud 14 is typically made up of multiple vertical sections or levels, each including plural arcuate Type 304 steel plates having a thickness on the order one and one-half inches and welded together at their abutting vertical and horizontal edges. For purposes of convenience, the arcuate plates making up the different shroud levels are not individually illustrated in FIG. 1, it being noted that U.S. Pat. No. 5,402,570 to Weems et al provides an adequate description of the arcuate plates making up the different levels of a typical shroud.

A steam separator assembly 40 is mounted on a steam plenum head assembly 42 on top of shroud sealing lid 36, and a steam drying assembly 44 is disposed above the steam separator assembly. A lower reactor core support plate 46 mounted on a radial flange 48 extending inwardly from shroud 14 near the lower edge of the lower cylindrical section 22 supports a fuel assembly 50, also disposed within the shroud. A lower core grid 52 and upper core grid 54 are positioned beneath and above fuel assembly 50, respectively.

Control rod guide tubes 56 are provided within vessel 12 at locations above a control rod driving mechanism (not shown) located at the bottom of the vessel beneath shroud 14. The lower ends of corresponding control rods 58 are detachably connected to the driving mechanism and are arranged to move up and down within guide tubes 56.

Recirculated water is delivered into vessel 12 via one or more inlet ports 60 and egresses via one or more outlet ports 62. One or more steam outlets 64 communicates between the interior and exterior of vessel 12 at a location above the shroud and the steam separator assembly.

The components of the boiling water reactor as thus far described are conventional and can have any known configuration in accordance with the operational requirements of the reactor.

In accordance with the present invention, a plurality of tie-rods 66 are secured to sites on shroud 14 adjacent the top and bottom of the shroud at a respective plurality of angularly spaced locations about the shroud periphery, and one or more seismic supports 68 is mounted on each tie-rod to resist horizontal seismic loads and to hold the shroud in place relative to the reactor vessel in the event of cracking along any horizontal weld during a seismic event. The features of the shroud assembly are typically the same at a plurality of angularly spaced locations about the shroud periphery where the tie-rods are installed. Accordingly, the shroud assembly will hereinafter be described with reference to a single angular location for purposes of clarity.

Figure 2:
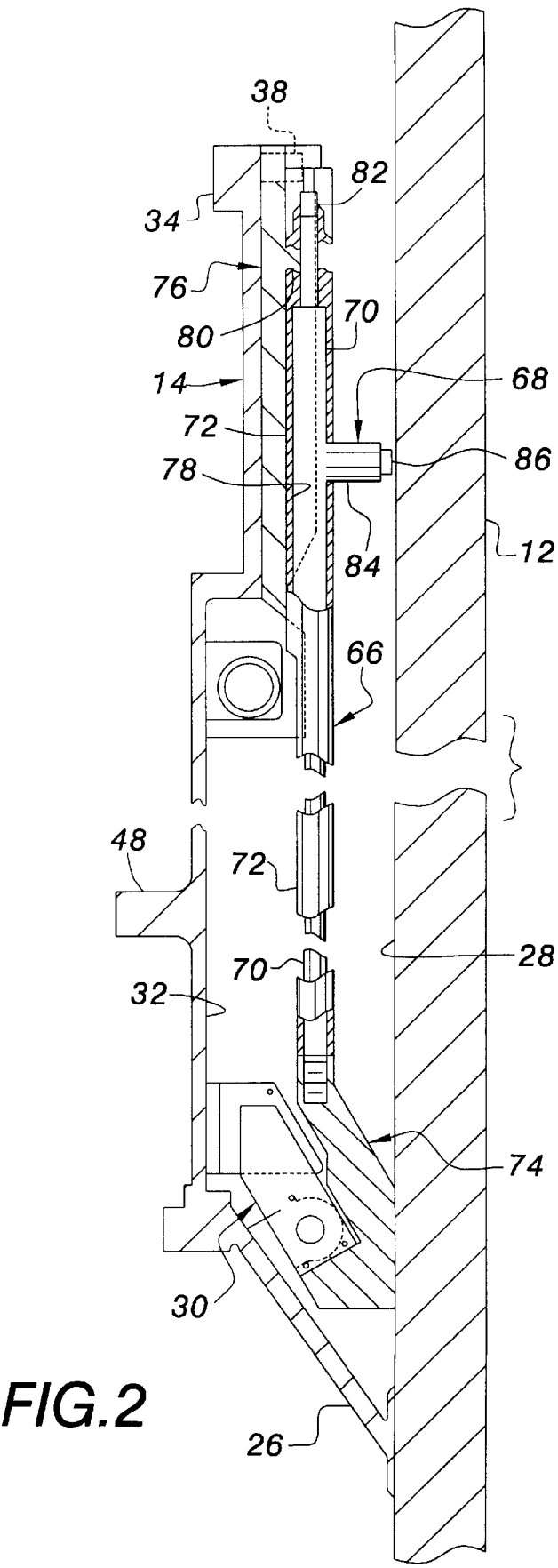
FIG. 2 is a fragmentary side view in broken longitudinal section of the boiling water reactor in FIG. 1 showing a seismic support mounted on a tie-rod according to the present invention.

Tie-rods 66 are essentially the same as those described in U.S. Pat. No. 5,402,570; however, any type of tie-rod can be used, including, but not limited to, the tie-rods shown and described in U.S. patent application Ser. No. 08/358,085, filed Dec. 15, 1994, now U.S. Pat. No. 5,600,689, the disclosure of which is incorporated herein by reference. Referring now to FIG. 2, it can be seen that the particular tie-rod shown includes a central or inner rod 70 and an outer tube 72 disposed concentrically around the rod with a small radial clearance. A hook or similar engagement member 74 is secured to a bottom end of rod 70 (e.g., by use of threads) and is configured to engage the underside of bracket 30 to prevent upward axial movement of the tie-rod. For reactors not provided with brackets 30, it will be appreciated that suitable holes can be formed in support structure 26 (e.g., by drilling, EDM techniques, etc.) to receive and threadedly (or otherwise) engage the bottom of each tie-rod.

An upper end of rod 70 is secured to a metal beam or plate 76 installed between a respective pair of angularly spaced lugs 38. Beam 76 can be secured to the shroud directly and/or to the lugs by any suitable means, such as, for example, use of slots, adhesives and/or screws. A hole or channel 78 is defined vertically through the beam to receive the upper end of rod 70, and the rod is axially tightened against a flange 80 extending from the beam with a nut 82 threadedly engaging the upper end of rod 70.

The bottom end of tube 72 is fixedly secured to the top of engagement member 74, for example, by welding or threaded engagement. The upper end of tube 72 terminates below the top of rod 70 so as to be spaced somewhat below flange 80.

Figure 3:
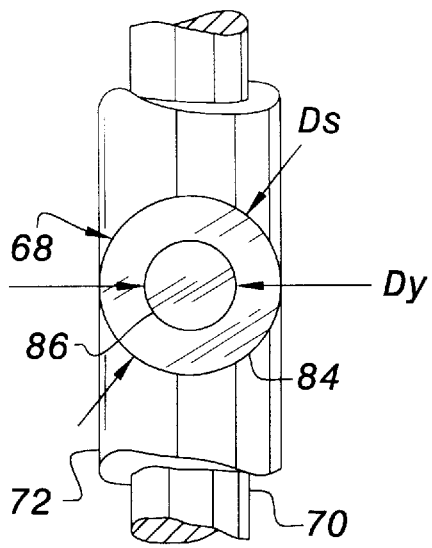
FIG. 3 is a front view of the seismic support shown in FIG. 2.
Figure 4:
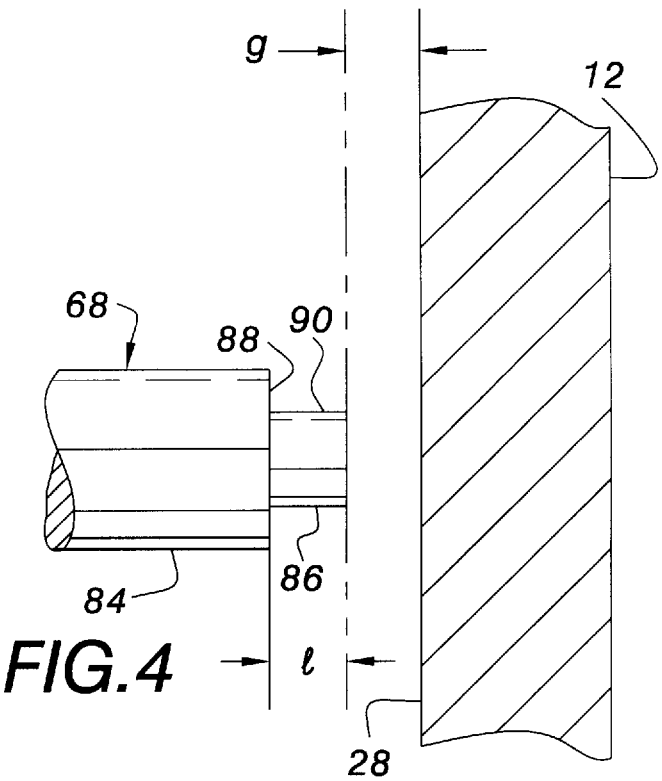
FIG. 4 is a fragmentary side view of the seismic support shown in FIG. 3.

In accordance with the present invention, a seismic support 68 mounted near the upper end of tube 72 includes a radial spacer 84 to limit movement of the shroud relative to the vessel during a seismic event and a deformable or yieldable member 86 coupled with the spacer to absorb and dissipate seismic energy. As best seen in FIGS. 3 and 4, spacer 84 is a generally cylindrical projection extending perpendicularly from tube 72 in a radial or lateral direction relative to a longitudinal axis of the shroud to a step or shoulder 88 connecting the spacer with deformable member 86, the deformable member being of generally cylindrical configuration like spacer 84 but with a diameter $D_y$ smaller than the diameter $D_s$ of the spacer and an axial length l to resist or control buckling under seismic loading conditions. Deformable member 86 extends radially or laterally outward, relative to the longitudinal axis of the shroud, from step 88 to a bearing surface 90 radially spaced from interior surface 28 of the vessel to define a clearance gap therebetween.

The spacer and deformable member can be formed of the same material or of different materials and can be of integral one-piece construction or formed as separate pieces and joined together in any suitable manner, such as, for example, by use of adhesives, threaded engagement and/or welding. In a preferred embodiment, spacer 84 and deformable member 86 are formed as an integral one-piece unit of a solution annealed and rapid quenched Type 304 stainless steel such as, for example, ASTM A240; however, any material having relatively high ductility (e.g., between about 30 and about 50% reduction in area) to absorb maximum kinetic energy during impact without fracture or other mechanical failure; high fracture toughness to avoid brittle fracture due to material imperfections combined with high stress at possibly low temperature (depending on the application); high yield strength (e.g., between about 80 and about 100 kpsi) to minimize the size of the yieldable member; and little or no work hardening or strain rate effects to absorb kinetic energy at relatively constant load (thereby minimizing the maximum load applied to the shroud for a given amount of energy) can be used including, but not limited to, austenitic stainless steels such as Type 304, 304L, 316, 316L and XM-19, high nickel-content alloys such as Inconel 600 and 690, and precipitation hardenable high nickel-content alloys such as Inconel X-750 and 718.

Yield strength of a material, that is, the stress at which the material is said to deform plastically, is usually expressed as a yield stress in units of force divided by area. Since yield stress is essentially constant for a given material, a reduction in the cross-sectional area of a component formed of the material will result in a decrease in the load or force needed to plastically deform the component. In the case of the seismic support shown in FIGS. 2–4, spacer 84 and deformable member 86 are formed of the same material; however, since the deformable member is of smaller cross-sectional area than the spacer, the deformable member will tend to deform plastically at lower levels of loading than the spacer. Forces or loads lower than that needed to plastically deform the deformable member (i.e., below the elastic limit) are transmitted elastically from the deformable member to the spacer while, for loads greater than the elastic limit, only the portion of the load corresponding to the elastic limit will be transmitted to the spacer and the remainder of the load will be absorbed in plastically deforming the yieldable member. For a yieldable member formed of a material exhibiting little or no work hardening, plastic deformation of the yieldable member will occur at relatively constant load. Thus, a force limiting mechanism similar to a fuse-link is established by the seismic support whereby the deformable member can, for example, be designed to deform elastically in response to loads generated during an operating basis earthquake and plastically during a design basis earthquake so as to limit the maximum load on a boiling water reactor shroud to that normally experienced during an operating basis earthquake. By "operating basis earthquake" is meant an earthquake of limited severity after which the reactor can be operated without substantial inspection and repair. By "design basis earthquake" is meant an earthquake of the maximum severity that the reactor is designed to withstand and still be safely shut down for inspection and repair.

The dimensions of the spacer and the yieldable member are chosen so as to establish a desired clearance gap between the core shroud and the reactor vessel and to produce yielding, that is, permanent deformation of the yieldable member at a desired load. For example, if the spacer and the yieldable member are both formed of solution annealed, rapid quenched Type 304 stainless steel and a desired yield load for the yieldable member is about 80,000 pounds, the yieldable member could, for example, have a length, of about one inch to control buckling and to limit yield strain, and the diameter $D_y$ of the yieldable member would then preferably be chosen to define a bearing surface having a cross-sectional area equal to the desired yield load (i.e., 80,000 pounds) divided by the yield strength of the material (about 18,500 psi for Type 304 stainless steel) such that the cross-sectional area of the bearing surface would be about 4.32 in$^2$ and the diameter $D_y$ would then be about 2.35 in. If the spacer and the yieldable member are made of the same material or of materials having about the same yield strength, the cross-sectional area of the spacer should be large enough to withstand the desired yield load for the yieldable member without permanently deforming. Preferably, the cross-sectional area of the spacer will be about twice the cross-sectional area of the yieldable member or, using the exemplary dimensions above, about 8.64 in$^2$. If local yielding of the spacer is acceptable or if the spacer is formed of a material having a higher yield strength than the yieldable member, a spacer with a smaller cross-sectional area can be used. The length of the spacer is chosen to equal the radial or lateral distance between the core shroud and the reactor vessel less the length of the yieldable member and the desired clearance gap g. The size of the clearance gap g will determine the number of shroud impacts with the reactor vessel during a seismic event; and, since each impact will generate a load on the shroud, it is desirable to limit the total number of impacts. In the case of a typical boiling water reactor, for example, the clearance gap g will generally range from about 0.0 inch to about 0.375 inch, the latter gap being sufficiently large to limit the number of impacts from a design basis earthquake (DBE) to about three. If the maximum lateral seismic load for a DBE is about 165,000 pounds and the yieldable member is designed to yield at loads of about 80,000 pounds, the maximum lateral load on the shroud for each impact will be about 80,000 pounds with the remainder of the load (i.e., about 85,000 pounds) being absorbed in plastically deforming the yieldable member. In the case of a DBE of about 165,000 pounds and three impacts, a maximum accumulated strain of the yieldable member would be about 0.018 inches.

Deployment of the tie-rod assembly, including tie-rod 66 and seismic support 68, involves lowering the assembly vertically downward between the shroud and the reactor vessel in an orientation where it is rotated about 90 degrees relative to its final deployment orientation. This permits engagement member 74 and seismic support 68 to be freely moved longitudinally until the assembly is at its proper vertical position. The assembly is then rotated 90 degrees about the tie-rod axis whereupon engagement member 74 engages the underside of bracket 30, and the outermost surface of the engagement member and the seismic support 68 are disposed between the tie-rod 66 and the interior surface 28 of the reactor vessel 12.

During an earthquake, reactor vessel 12 shakes due to seismic motion of the ground or rock upon which the reactor vessel support structure rests and, periodically, the gap g between the seismic support 68 and the reactor vessel is closed on one side of the shroud 14 and then on a diametrically opposed side of the shroud. When these gaps are closed, shroud 14 is made to impact vessel 12 via seismic supports 68 and a load is generated in the seismic supports due to the motion of the shroud as well as the motion of the reactor vessel. For an operating basis earthquake (OBE) each impact will generate a load on the yieldable member less than that needed to plastically deform the yieldable member (e.g., less than about 80,000 pounds in the case of the Type 304 yieldable member described above) such that essentially all of the lateral seismic load is transmitted elastically to the shroud via the yieldable member and spacer 84. Typical reactor equipment, including the shroud, is designed to continue operating after an OBE without repair so it is undesirable for the yieldable member to be excessively damaged (i.e., permanently deformed to a point where the clearance gap is too large to limit displacement of the shroud) during an OBE. On the other hand, considerable work (e.g., inspections and/or repair) is typically required before such equipment can be operated after a DBE and thus, substantial yielding (e.g., as much as 20 to 30%) of the yieldable member during a DBE is permissible. In the case of a DBE, loads greater than the yield load of the yieldable member are generated upon impact and a portion of the design basis load approximately equal to the yield load is transmitted to the shroud via elastic deformation of the yieldable member and the spacer. If the yield load is less than or equal to the operating basis load, the nuclear reactor equipment will remain undamaged. The portion of the design basis load exceeding the yield load, however, is absorbed in plastically deforming the yieldable member and is not transmitted to the shroud.

Figure 5:
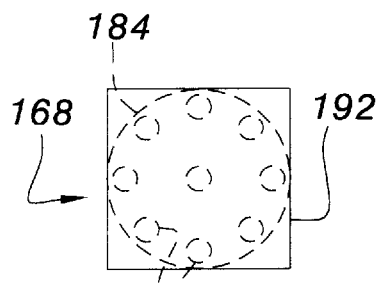
FIG. 5 is a front view of a modified seismic support according to the present invention.
Figure 6:
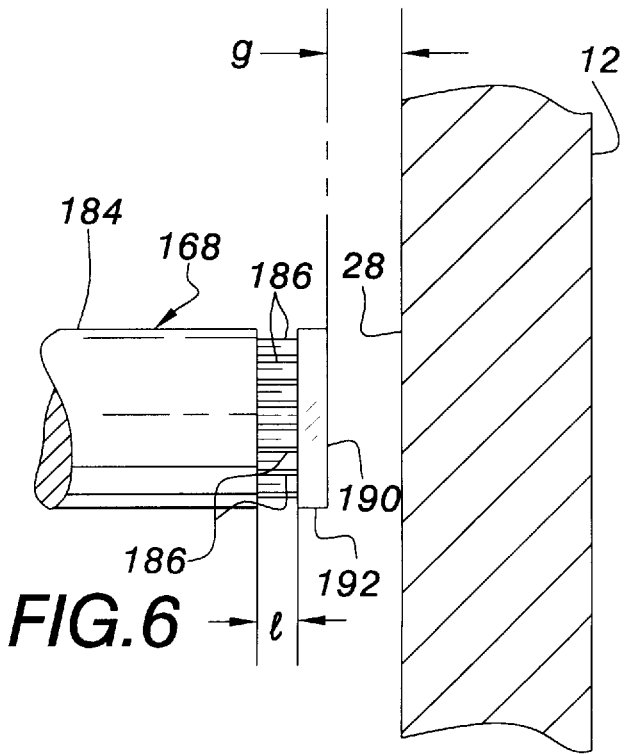
FIG. 6 is a fragmentary side view of the seismic support shown in FIG. 5.

A modification of the seismic support according to the present invention is shown in FIGS. 5 and 6 wherein the modified seismic support 168 includes a rectangular bearing plate 192 and a plurality of yieldable members 186 arranged in spaced relation between the bearing plate and spacer 184. Bearing plate 192 defines a broad, rectangular bearing surface or face 190 radially or laterally spaced from interior surface 28 of the reactor vessel to define a clearance gap g. The relatively broad bearing surface defined by the plate is preferably about the same size as or larger than the cross-sectional area of spacer 184 (e.g., about 3 inches on each side in the case of a rectangle) to minimize plastic deformation of the plate and to distribute impact loads on the reactor vessel in order to reduce local stresses on the vessel during seismic events. Yieldable members 186 are generally cylindrical and are arranged in angularly spaced relation near a peripheral edge of spacer 184 and at the center of the spacer, with respective longitudinal axes of each yieldable member being oriented in parallel with a longitudinal axis of the spacer. The yieldable members 186 each have a length l to prevent or control buckling, and a combined cross-sectional area of the yieldable members is such that each of the yieldable members will yield or deform plastically under the desired seismic load while the bearing plate and spacer will not. The number of yieldable members 186 is preferably equal to the desired overall yield load divided by the yield load for each individual yieldable member. The spacing between individual yieldable members should be sufficient to accommodate distortions due to yielding without significantly changing the yield load.

While the seismic support of the present invention has been described herein as part of a boiling water nuclear reactor having a core shroud disposed concentrically within a reactor vessel, it will be appreciated that the seismic support can be used to limit displacement of any supported structure relative to an adjacent structure during a seismic event while at the same time limiting the seismic impact load on the supported structure. Furthermore, when the seismic support forms a bearing surface spaced from the adjacent structure, thereby defining a gap between the supported and adjacent structure, the number and magnitude of impacts between the seismic support and the adjacent structure can be minimized. For example, no impacts will result from shaking of the adjacent structure within small amplitudes less than the size of the gap. Also, resonance effects will be avoided due to the random timing of the impacts which do occur.

When installed on structures other than reactors, the seismic supports can be formed of any carbon and alloy structural steels in common use such as, for example, ASTM A36 steel and the higher strength "T-1" steels, but preferably not tool steels which have relatively low ductility. Notably, however, many of these structural steels exhibit large strain rate effects which would be undesirable for seismic applications where such effects would tend to increase load during initial impact. This would make the design more complicated since the yield load would be sensitive to the rate of load application (i.e., strain rate). In addition to the structural steels described above, aluminum alloys as well as stainless steels can be used.

In the case of a boiling water reactor shroud disposed concentrically within a reactor vessel, the seismic support can be mounted on the shroud and/or the reactor vessel. When installed as part of a repair for cracked shroud welds, the seismic supports can be carried on tie-rods secured to sites on the shroud at regular angular intervals about the periphery of the shroud as described in U.S. Pat. No. 5,402,570 and U.S. Pat. No. 5,600,689. While one seismic support is shown mounted on each tie-rod, it will be appreciated that seismic supports can be mounted on fewer than all the tie-rods installed and that more than one seismic support can be mounted on a single tie-rod in vertically spaced relation. Any number of seismic supports can be installed about the periphery of a shroud at regular or irregular angular intervals.

The spacer can be cylindrical as shown or have any configuration to limit displacement of a supported structure such as a boiling water reactor relative to an adjacent structure such as a reactor vessel including, but not limited to, rectangular, conical, frustoconical, spherical, hollow and solid configurations. The material and/or cross-sectional area of the spacer are preferably such that impact loads caused by an operating basis earthquake will not cause the spacer to deform plastically an appreciable amount.

The yieldable member can have any configuration to yield under the desired seismic load including, but not limited to, the cylindrical configurations shown as well as cubic, parallelpiped, conical, frustoconical, spherical, cylindrical with longitudinal axes oriented radially relative to the shroud and cylindrical with longitudinal axes oriented tangentially relative to the shroud. Furthermore, the yieldable member can be formed with holes, recesses or other features to achieve a desired yield load. When made of the same material as the spacer or of a material having a similar yield strength as that of the spacer material, the yieldable member is preferably of smaller cross-sectional area than the spacer so as to be plastically deformed in response to the desired seismic load; and, when multiple yieldable members are mounted on a spacer, any combination of shapes can be used. When a single yieldable member is mounted on a spacer, the yieldable member can be arranged concentrically with the spacer longitudinal axis as shown or arranged in an eccentric position relative to the spacer longitudinal axis.

As mentioned previously, the yieldable member is preferably made of a material with little or no strain rate sensitivity or work hardening characteristics so that the yieldable member will deform plastically as needed under relatively constant load to absorb the kinetic energy of the design basis earthquake. By "relatively constant" load is meant a load varying in magnitude no more than about ten to about twenty percent or, in other words, a load expressed as a substantially horizontal line on a plot of force versus displacement (with absorbed energy being equal to the area beneath the line). By way of contrast, the load will generally increase with deflection of a spring system so that, for the same degree of deformation and energy absorbed, the maximum load on a spring system will be higher than that for a seismic support according to the present invention.

When the yieldable member or members are disposed between a bearing plate and a spacer, the bearing plate can be of the same general size and shape as the spacer or have any other shape or size suitable for distributing the load on the reactor vessel. The bearing plate and spacer can be formed of any of the materials listed above for the yieldable member and, in addition, materials having somewhat lower ductility, fracture toughness and more work hardening could be used. The bearing plate or surface defined by the seismic support can be flat or curved to conform to the shape of the interior surface of the reactor vessel and is preferably spaced from the interior surface of the vessel to minimize the number and magnitude of impacts with the vessel wall but can also abut the interior surface of the vessel if desired. In addition, the inner end of each seismic support can be mounted so as to be spaced from or to abut the outer surface of the core shroud.

The seismic support is preferably unbiased as shown but can be held in tension or compression between the shroud and the reactor vessel and/or provided with bias members such as springs if desired.

When it is desired that the bearing surface of the seismic support be spaced from the reactor vessel, the gap between the bearing surface of the support and the vessel can be set by prefabricating the seismic support to size as part of an original installation, by fabricating the yieldable member and/or bearing plate oversize and then custom machining them to fit an already installed reactor, or by use of a mechanical adjustment feature such as, for example, a drive screw and/or a wedge. Operating conditions of the reactor must also be considered when establishing the gap to allow for thermal expansion and other environmental effects.

Inasmuch as the present invention is subject to many variations, modification and changes in detail it is intended that all subject matter discussed above or shown in the accompanying drawings be interpreted as illustrative only and not be taken in a limiting sense.

What is claimed is:

1. In a nuclear reactor including a reactor vessel and a core shroud disposed within the reactor vessel in laterally spaced relation, a seismic support comprising
    a spacer extending between laterally opposed surfaces of said reactor vessel and said core shroud to limit lateral movement of said core shroud, said spacer having a configuration to deform substantially elastically in response to impacts caused by operating and design basis earthquakes relative to said reactor vessel; and
    a deformable member carried by said spacer and having a configuration to deform substantially elastically in response to impacts caused by an operating basis earthquake and substantially plastically at relatively constant load in response to impacts caused by a design basis earthquake to limit the maximum load on said core shroud to about that normally experienced during an operating basis earthquake.

2. A nuclear reactor as recited in claim 1 wherein said deformable member is carried at an end of said spacer adjacent said reactor vessel.

3. A nuclear reactor as recited in claim 2 wherein said deformable member is of reduced cross-sectional area as compared with said spacer.

4. A nuclear reactor as recited in claim 3 wherein said spacer and said deformable member are of integral one-piece construction.

5. A nuclear reactor as recited in claim 1 and further comprising a bearing member carried by said spacer adjacent said reactor vessel, wherein said deformable member is disposed between said bearing member and said spacer.

6. A nuclear reactor as recited in claim 5 and further comprising a plurality of deformable members disposed between said bearing member and said spacer.

7. A nuclear reactor as recited in claim 6 wherein said deformable members are arranged in spaced relation between said bearing member and said spacer.

8. A nuclear reactor as recited in claim 5 wherein said bearing member includes a plate.

9. A nuclear reactor as recited in claim 1 and further comprising a plurality of seismic supports disposed at angularly spaced locations between laterally opposed surfaces of said reactor vessel and said core shroud.

10. A nuclear reactor as recited in claim 9 and further comprising a plurality of tie-rods secured to upper and lower portions of said core shroud at angularly spaced locations about a periphery of said shroud, wherein each of said seismic supports is mounted on one of said tie-rods.

11. A nuclear reactor as recited in claim 9 wherein outer ends of said seismic supports are laterally spaced from said reactor vessel to define a clearance gap therebetween.

12. A nuclear reactor as recited in claim 11 wherein said clearance gap is between about 0.0 inches and about 0.375 inches.

13. A method of maintaining a nuclear reactor core shroud in spaced relation with a nuclear reactor vessel during seismic events comprising the step of
    mounting a plurality of seismic supports between opposed surfaces of the core shroud and the reactor vessel, each seismic support including a spacer carrying a deformable member, said spacer having a configuration to deform substantially elastically in response to impacts caused by operating and design basis earthquakes and said deformable member having a configuration to deform substantially elastically in response to impacts caused by an operating basis earthquake and substantially plastically at relatively constant load in response to impacts caused by a design basis earthquake to limit the maximum load on said core shroud to about that normally experienced during an operating basis earthquake.

14. A method as recited in claim 13 and further comprising the step of securing a plurality of tie-rods to sites on the shroud adjacent the top and bottom of the shroud at a respective plurality of angularly spaced locations about the shroud periphery, and wherein said step of mounting a plurality of seismic supports between opposed surfaces of the core shroud and the reactor vessel includes mounting the seismic supports on the tie-rods.

* * * * *